(12) United States Patent
Frank

(10) Patent No.: US 11,029,143 B2
(45) Date of Patent: *Jun. 8, 2021

(54) METHOD AND DEVICE FOR OPTICAL SURFACE MEASUREMENT BY MEANS OF A CHROMATIC CONFOCAL SENSOR

(71) Applicant: NanoFocus AG, Oberhausen (DE)

(72) Inventor: Johannes Frank, Cologne (DE)

(73) Assignee: Nanofocus AG, Oberhausen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/327,158

(22) PCT Filed: Jul. 12, 2017

(86) PCT No.: PCT/EP2017/067565
§ 371 (c)(1),
(2) Date: Feb. 21, 2019

(87) PCT Pub. No.: WO2018/036715
PCT Pub. Date: Mar. 1, 2018

(65) Prior Publication Data
US 2019/0186903 A1 Jun. 20, 2019

(30) Foreign Application Priority Data
Aug. 25, 2016 (DE) ...................... 10 2016 115 827.5

(51) Int. Cl.
*G01B 11/24* (2006.01)
*G01B 11/02* (2006.01)

(52) U.S. Cl.
CPC ............ *G01B 11/24* (2013.01); *G01B 11/026* (2013.01); *G01B 2210/50* (2013.01)

(58) Field of Classification Search
CPC .. G01B 11/026; G01B 11/24; G01B 2210/50; G01B 11/0608
USPC ..... 356/600–640, 237.1–237.6, 239.1–239.8
See application file for complete search history.

(56) References Cited

U.S. PATENT DOCUMENTS

| 3,452,278 | A | 6/1969 | Myers et al. |
| 2011/0235045 | A1* | 9/2011 | Koerner ............ G01B 9/02057 356/451 |

(Continued)

FOREIGN PATENT DOCUMENTS

| CN | 103245302 A | 8/2013 |
| CN | 104797903 A | 7/2015 |

(Continued)

OTHER PUBLICATIONS

International Search Report with English Translation issued in the corresponding International Patent Application No. PCT/EP2017/067565, dated Oct. 24, 2017 (7 pages).

(Continued)

*Primary Examiner* — Tri T Ton
(74) *Attorney, Agent, or Firm* — Adams and Reese LLP; Raymond R. Ferrera

(57) ABSTRACT

The invention relates to a method and a device for the optical measurement of technical surfaces by means of a chromatic confocal sensor, wherein light from a light source (2) is directed to the surface (5) of a sample to be measured via an optical system (4, 14) with defined chromatic aberration. According to the invention, the light source (2) can be tuned in relation to the wavelength to be emitted. The light reflected back from the sample surface (5) is directed to at least one photosensor (7), wherein the sensor signal is measured over time by means of a detection system (8) and the time of a signal maximum is determined. The detection system (8) derives the height Z of the surface (5) from the wavelength of the light source (2) at the time of the signal maximum.

13 Claims, 2 Drawing Sheets

(56) References Cited

U.S. PATENT DOCUMENTS

2013/0201488 A1   8/2013   Ishihara
2017/0234678 A1   8/2017   Schonleber et al.

FOREIGN PATENT DOCUMENTS

| DE | 102008029459 A1 | 2/2010 |
| DE | 102012111008 A1 | 5/2014 |
| DE | 102013016368 A1 | 4/2015 |
| DE | 102016100261 A1 | 7/2017 |
| GB | 2497792 A | 6/2013 |

OTHER PUBLICATIONS

Written Opinion of the International Searching Authority with English Translation issued in the corresponding International Patent Application No. PCT/EP2017/067565, dated Oct. 24, 2017 (14 pages).

International Preliminary Report on Patentability issued in the corresponding International Patent Application No. PCT/EP2017/067565, dated Feb. 26, 2019 (8 pages).

Chen D. Lu, Martin F. Kraus, Benjamin Potsaid, Jonathan J. Liu, Woojhon Choi, Vijaysekhar Jayaraman, Alex E. Cable, Joachim Hornegger, Jay S. Duker, and James G. Fujimoto, "Handheld Ultrahigh Speed Swept Source Optical Coherence Tomography Instrument Using a MEMS Scanning Mirror", Biomedical Optics Express, Jan. 2014, vol. 5, No. 1, pp. 293-311.

* cited by examiner ns system in combination with the optical
METHOD AND DEVICE FOR OPTICAL SURFACE MEASUREMENT BY MEANS OF A CHROMATIC CONFOCAL SENSOR

FIELD OF THE INVENTION

The invention relates to a method for the optical measurement of technical surfaces by means of a chromatic confocal sensor, wherein light from at least one light source is directed to the surface of a sample to be measured via an optical system with defined chromatic aberration.

In addition, the invention relates to a chromatic confocal sensor for carrying out the method, having at least one light source, the light from which is directed to the surface of a sample to be measured via an optical system with defined chromatic aberration.

BACKGROUND INFORMATION

In confocal measurement technology, light from a light source is generally focused on the surface to be measured via a confocal filter, a beam splitter and a lens. In the past, this involved moving either the measuring stage on which the sample was located or the lens up and down in the Z direction and evaluating the precise moment when the focus hit the surface to be measured. This light is passed to an appropriate sensor via a confocal filter (e.g. a pinhole aperture). The sensor shows a maximum signal when the surface is precisely in focus. This enables the precise Z height of the surface to be determined.

Because of the inertia of the masses to be moved, this version of the method is incapable of delivering higher measuring rates.

As development has progressed, therefore, although the scanning methods have been developed further, the fact that mechanical components are still involved means that these methods also have their limits.

A method in which these mechanical elements are not necessary is the use of a chromatic confocal sensor. The broadband spectrum of a light source (e.g. white light) is passed to the sample surface via an optical system with defined dispersion. Because of the dispersion a longitudinal chromatic aberration is obtained, by means of which a defined Z position on the sample surface can be assigned to each "color of light" and thus the sample topography can be determined. Mechanical scanning in the Z direction is therefore no longer necessary.

In chromatic confocal sensors the correct Z position of the sample surface, i.e. the topography, is traditionally determined by means of a spectrometer. The light reflected by the sample is spectrally analyzed, the dominant wavelength corresponding to the Z position of the sample. The spectrometer lines used can be read at data rates of several kHz, allowing fast chromatic confocal sensors to be made. However, the readout speed of the spectrometer lines reaches its limits in the region of several kHz and cannot easily be increased.

SUMMARY OF THE INVENTION

The invention is therefore based on the object of developing a method of the type mentioned above in such a way that very high measuring rates become possible.

The invention achieves this object starting from a method of the type stated above by means of the fact that the light source is tuned in relation to the wavelength to be emitted and the light reflected back from the sample surface is directed to at least one photosensor, wherein the sensor signal is measured over time and the time and intensity of a signal maximum are determined and evaluated, wherein the height Z of the surface is derived from the wavelength of the light source at the time of the signal maximum.

By means of varying the wavelength of a "swept source" used as the light source in combination with the optical system with defined chromatic aberration, a purely optical "scanning" takes place in the Z direction between the optical system and the sample surface. The light falling on the sample surface is focused through the Z region and reflected back and, in the simplest case, falls on a fast photodiode as a photosensor, which is used to determine the signal maximum, wherein the tunable light source is synchronized with a detection system that is used, in terms of the time dependency of the wavelength, such that the wavelength of the reflected light in the signal maximum is determined from the time-based line of the signal curve and thus the height Z of the sample can be deduced.

The photosensor can take the form of a point sensor. According to the invention, however, it is also provided that the light from the light source is split into a plurality of beamlets and a multi-channel sensor, e.g. a (linear or matrix) array of photodiodes, is used as a detector.

Likewise, a plurality of light sources can be used, wherein the individual beams from the light sources that are reflected back are detected in parallel by means of an appropriate multi-channel photosensor.

This type of parallelization allows the detection of the sample topography to be accelerated further by the fact that the individual beams simultaneously scan multiple points on the sample surface that are spaced apart from each other.

In a possible embodiment of the method according to the invention, the detection system used to analyze the time-varying signal of the photosensor has an extreme value memory which monitors the time-varying signal until an extreme of the signal has-been reached in each case, a peak indicator signal being generated in each case when the extreme is reached, with the aid of which the time of the extreme is established and with the aid of which in turn the wavelength of the light source associated with the signal maximum is established. If the time-based line of the signal has multiple (local) extremes, the (absolute) signal maximum should be associated with the most recently generated peak indicator signal during a tuning cycle of the light source. The detection of multiple (local) signal maxima is also possible using this method, e.g. to determine the layer thickness distribution of a coating on the sample surface using the method according to the invention.

The above object is achieved by the invention, starting from a chromatic confocal sensor of the type stated above, by the fact that the light source can be tuned with reference to the wavelength to be emitted and the light reflected back from the sample surface is directed to at least one photosensor, wherein the sensor signal is measured over time by means of a detection system and the time of a signal maximum is determined, wherein the detection system is configured to derive the height Z of the surface from the wavelength of the light source at the time of the signal maximum.

The light from the light source is directed to the optical system with defined chromatic aberration e.g. via a semi-transparent mirror or a beam splitter cube as a beam splitter. The light reflected back through the optical system passes through the semi-transparent mirror to the photosensor, only the light that is essential for the measurement being allowed to pass through a confocal filter (pinhole) located upstream of the sensor. Using such an arrangement, the light on the sensor is at its maximum when the light source emits the wavelength that is focused on the surface of the sample owing to the longitudinal aberration of the lens. When a cyclically spectrally tuned light source is employed, the sensor signal displays a typical signal peak (confocal peak). If the wavelength and spectral characteristics of the lens are known, the height of the sample at the respective measuring position can be determined from the time when this signal maximum occurs.

Another possibility consists in designing the device in an integrated manner using fiber optics. In this case the light source, the photosensor and the optical system are connected together using optical fibers.

Particularly advantageously for the invention, a laser is employed as the light source. These wavelength-tunable swept laser sources (e.g. the FDML-1310 from OptoRes) offer sweep rates of up to 1.5 MHz with bandwidths of >100 nm. However, any other wavelength-tunable light source is suitable, in principle, for the method.

These swept sources are already employed in particular in the medical sector in optical coherence tomography (OCT), as can be seen e.g. from the article "Handheld ultrahigh speed swept source optical coherence tomography instrument using a MEMS scanning mirror" Chen D. Lu, Martin F. Kraus, Benjamin Potsaid, Jonathan J. Liu, WooJhon Choi, Vijaysekhar Jayaraman, Alex E. Cable, Joachim Hornegger, Jay S. Duker and James G. Fujimoto, BIOMEDICAL OPTICS EXPRESS 293, 20 Dec. 2013.

When a swept laser as described above is employed in combination with the chromatic confocal sensor, extremely high measuring rates are possible. More than 1,000,000 (3D) measuring points per second per measuring channel are achieved. During the topography measurement the sample being investigated is moved in the X/Y direction relative to the optical system, i.e. transversely to the direction of the light beam directed to the sample surface, so that the surface is scanned in a raster pattern. For the movement, an X/Y positioning device of a type that is known per se can be used.

In order for this extremely high measured data rate and the associated signals to be evaluated correspondingly rapidly, a detection system of the type described above is preferably used, which analyses the sensor signal electronically, wherein the detection system has an extreme value memory which monitors the time-varying signal until an extreme of the signal is reached in each case, a peak indicator signal being generated in each case when the extreme is reached, with the aid of which the time of the extreme and with the aid of which in turn the wavelength of the light source associated with the signal maximum is established. The manner in which the detection system functions in determining the signal maximum is described in the patent application DE 10 2016 100 261.6 to which reference is made in full.

Thus, multiple signal evaluations can be performed simultaneously in parallel and the respective time signals can be detected in a multi-channel manner and the detected maxima evaluated in a multi-channel manner.

The high measuring rate that can be achieved opens up new areas of application for confocal chromatic measurement technology. For instance, surface inspection becomes possible in manufacturing processes in which the sample is moved at a high feed velocity (rolling of sheet metal, drawing of films).

As with the conventional use of measurement technology, the rapid version according to the invention can also be used to check the thickness of thin, transparent samples or transparent coatings, provided that the top and bottom of the film/layer are within the measuring range of the sensor. In this case, the light reflected at the sample displays maxima at two different wavelengths. The layer thickness can be deduced from the spectral distance between the light maxima.

Naturally, the list of areas of application is not exhaustive.

BRIEF DESCRIPTION OF THE DRAWINGS

Exemplary embodiments of the invention are explained in more detail below with reference to drawings. These show the following.

DETAILED DESCRIPTION

Figure 1:
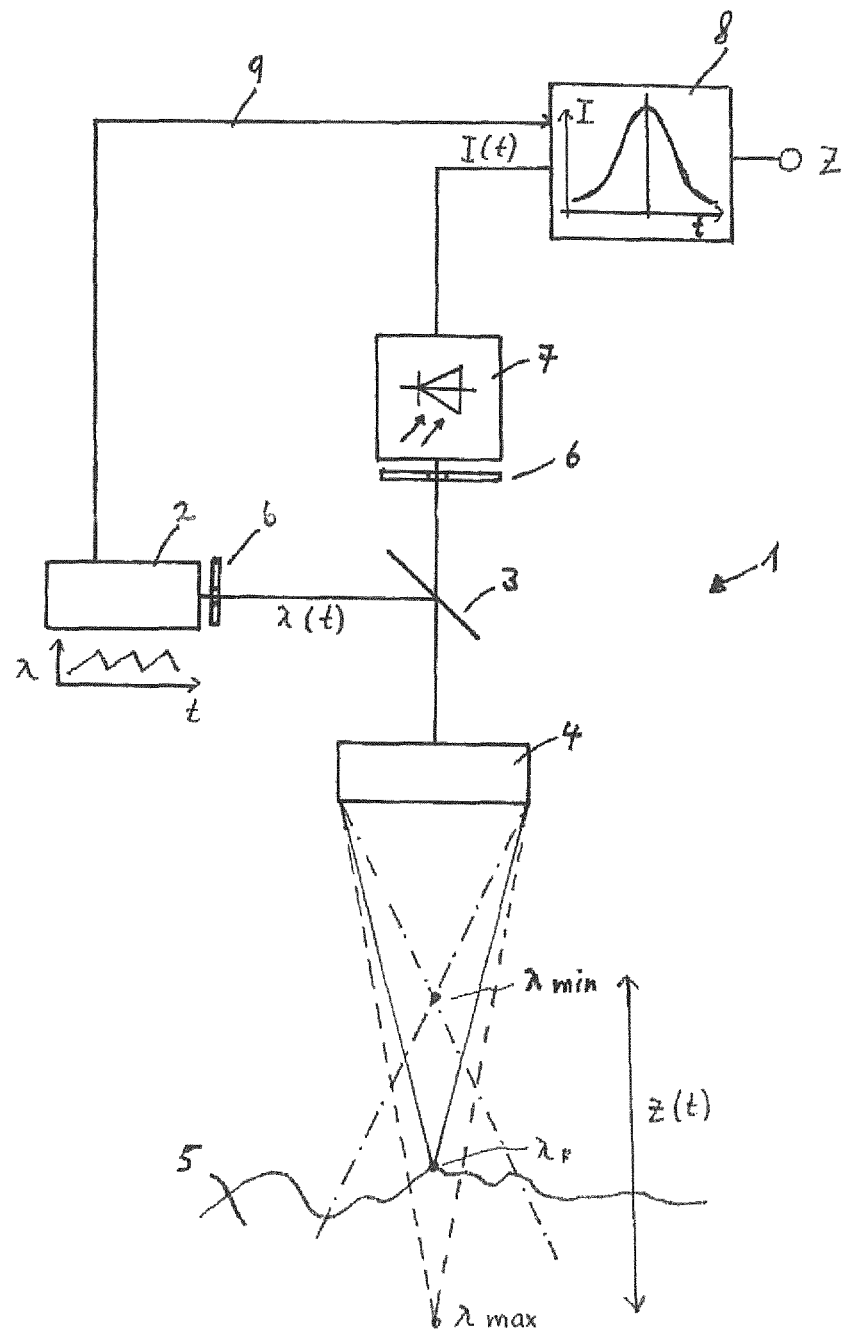
FIG. 1: a schematic illustration of a sensor arrangement according to the invention in free-beam configuration.

FIG. 1 shows a chromatic confocal sensor which is provided with the general reference number 1. The essential components of this chromatic confocal sensor 1 are on the one hand a tunable light source, preferably a suitable laser (swept laser source), which is provided with the reference number 2. The tunable laser 2 emits its light with variable wavelengths through a confocal filter (pinhole) 6 via a beam splitter 3, which is a semi-transparent mirror in the present example, to an optical system 4, which consists of a lens with defined longitudinal chromatic aberration. The light is focused at different heights in the Z direction, depending on the wavelength, and directed to a sample 5 which is only indicated. The wavelength of the light source is preferably varied cyclically so that the focus can be scanned in the Z direction in a rapid sequence.

When the laser is tuned, light of a specific wavelength is focused on the surface of the sample. The light is reflected back from the surface through the optical system 4, the semi-transparent mirror 3, passed through a further confocal filter (pinhole) 6 to a photosensor 7, which can be an individual photodiode, of which the measured signal (I(t)) over time gives the intensity distribution as shown at 8.

The laser 2 is synchronized with the detection system 8 analyzing the sensor signal of the photosensor 7, as indicated with the reference number 9, so that a detected signal maximum can be associated with the corresponding wavelength of the laser 2 at that moment in each case. As a result of the synchronization between laser 2 and detection system 8, the precise wavelength ($\lambda_F$) belonging to the signal maximum of the intensity curve is determined. This gives the height of the sample surface if the position of the focus ahead of the chromatic lens is known as a function of the wavelength. To increase the accuracy and improve the linearity, the transfer function between wavelength and focus distance can additionally be calibrated.

Figure 2:
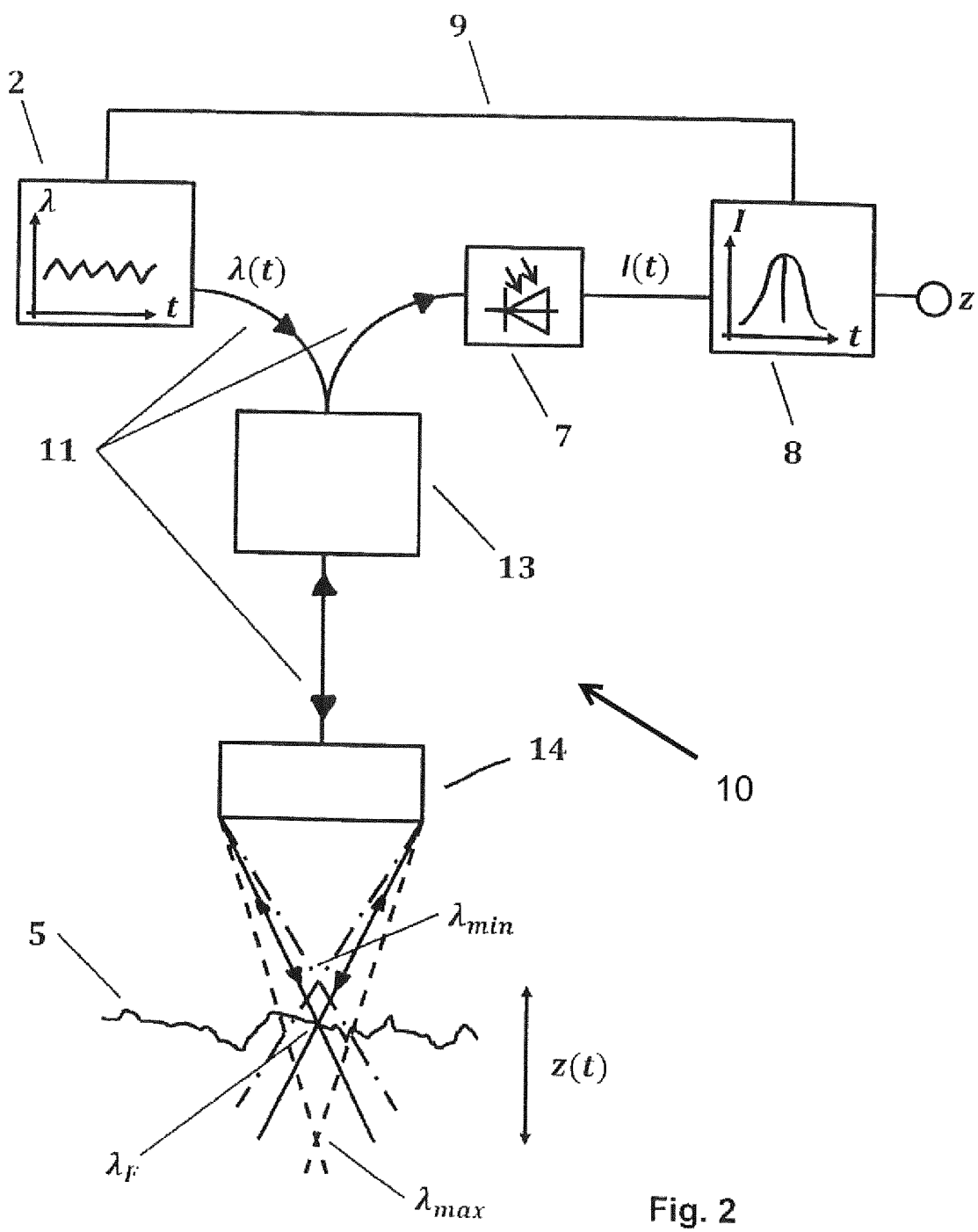
FIG. 2: a schematic illustration of a sensor arrangement according to the invention in a fiber-based configuration.

FIG. 2 shows a fiber-based variant 10 of the sensor arrangement according to the invention. Components that correspond to each other are labelled with the same reference numbers as in FIG. 1. The tunable light source 2 is connected at its outlet to a fiber coupler 13 via an optical fiber 11. This in turn is coupled via a further fiber section 11 to a measuring head 14 comprising a lens with defined chromatic aberration. Via a further fiber section 11, the fiber coupler 13 connects to the photosensor 7, which thus receives the light reflected at the sample 5.

The invention claimed is:

1. A method for the optical measurement of technical surfaces by means of a chromatic confocal sensor, wherein light from at least one light source is directed to the surface of a sample to be measured via an optical system with defined chromatic aberration,
   wherein the light source is tuned in relation to the wavelength to be emitted and the light reflected back from the sample surface is directed to at least one photosensor, wherein the sensor signal is measured over time and, the time and intensity of a signal maximum are determined and evaluated, wherein the height Z of the surface is derived from the wavelength of the light source at the time of the signal maximum,
   whereby the time-varying signal of the photosensor is analyzed electronically by means of a detection system to determine the signal maximum, wherein the detection system has an extreme value memory which monitors the time-varying signal until an extreme of the signal has been reached in each case, a peak indicator signal being generated in each case when the extreme is reached, with the aid of which the time of the extreme is established and with the aid of which in turn the wavelength of the light source associated with the signal maximum is established.

2. The method according to claim 1, wherein the light from the light source is split into a plurality of beamlets, wherein the beamlets that are reflected back are detected in parallel by means of a multi-channel photosensor.

3. The method according to claim 1, wherein a plurality of light sources are used, wherein the individual beams of the light sources that are reflected back are detected in parallel by means of a multi-channel photosensor.

4. A chromatic confocal sensor for carrying out the method according to claim 1, having at least one light source, the light from which is directed via an optical system with defined chromatic aberration to the surface of a sample to be measured,
   wherein the light source can be tuned in relation to the wavelength to be emitted and the light reflected bark from the sample surface is directed to at least one photosensor, wherein the sensor signal is measured over time by means of a detection system and the time of a signal maximum is determined, wherein the detection system is configured to derive the height Z of the surface front the wavelength of the light source at the time of the signal maximum.

5. The chromatic confocal sensor according to claim 4, wherein the photosensor is a photodiode.

6. The chromatic confocal sensor according to claim 4, wherein the light from the light source is split by means of a beam splitter into a plurality of beamlets, wherein the beamlets that are reflected back are detected in parallel by means of a multi-channel photosensor.

7. The chromatic confocal sensor according to claim 4, wherein, a plurality of light sources are provided, wherein the individual beams from the light sources that are reflected back are detected in parallel by means of a multi-channel photosensor.

8. The chromatic confocal sensor according to claim 4, wherein the light from the light source is directed via a beam splitter to the optical system with defined chromatic aberration.

9. The chromatic confocal sensor according to claim 8, wherein the beam splitter is a semi-transparent mirror.

10. The chromatic confocal sensor according to claim 8, wherein the beam splitter is a beam splitter cube.

11. The chromatic confocal sensor according to claim 4, wherein a confocal filter is located upstream of the photosensor and/or a confocal filter is located downstream of the light source.

12. The chromatic confocal sensor according to claim 4, wherein the light source, the photosensor and the optical system are connected to each other by fiber coupler via optical fibers.

13. The chromatic confocal sensor according to claim 4, wherein the light source is a laser.

* * * * *